United States Patent
Cieślikowski et al.

(10) Patent No.: US 8,925,708 B2
(45) Date of Patent: Jan. 6, 2015

(54) BEAD FEEDING METHOD AND BEAD FEEDING UNIT

(71) Applicant: International Tobacco Machinery Poland Sp. z o.o., Radom (PL)

(72) Inventors: Bartosz Cieślikowski, Radom (PL); Jacek Figarski, Radom (PL); Radosław Figarski, Radom (PL); Kazimierz Mąkosa, Radom (PL)

(73) Assignee: International Tobacco Machinery Poland Sp. z o.o., Radom (PL)

( * ) Notice: Subject to any disclaimer, the term of this patent is extended or adjusted under 35 U.S.C. 154(b) by 85 days.

(21) Appl. No.: 13/734,997

(22) Filed: Jan. 6, 2013

(65) Prior Publication Data

US 2013/0181003 A1    Jul. 18, 2013

(30) Foreign Application Priority Data

Jan. 18, 2012   (PL) .......................................... 397838

(51) Int. Cl.
| | |
|---|---|
| *B65G 17/32* | (2006.01) |
| *A24D 3/02* | (2006.01) |
| *B65G 29/02* | (2006.01) |
| *B65G 59/06* | (2006.01) |

(52) U.S. Cl.
CPC ........ *A24D 3/0204* (2013.01); *A24D 243/0216* (2013.01); *B65G 29/02* (2013.01); *B65G 59/067* (2013.01)
USPC .................. 198/397.02; 198/450; 198/478.1; 493/47

(58) Field of Classification Search
USPC ............... 198/396, 397.01, 397.02, 443, 450, 198/478.1; 221/255, 256, 277; 493/39, 47
See application file for complete search history.

(56) References Cited

U.S. PATENT DOCUMENTS 6,805,174 B2 * 10/2004 Smith et al. ..................... 141/67
7,757,835 B2 * 7/2010 Garthaffner et al. .......... 198/392
(Continued)

FOREIGN PATENT DOCUMENTS

| WO | 2009/071271 A1 | 6/2009 |
| WO | 2009/071272 A1 | 6/2009 |

OTHER PUBLICATIONS

Polish Search Report dated May 21, 2012 in application No. PO P.397838.

*Primary Examiner* — Gene Crawford
*Assistant Examiner* — Keith R Campbell
(74) *Attorney, Agent, or Firm* — Oppedahl Patent Law Firm LLC

(57) ABSTRACT

Beads are transferred in the form of a flow along supply channels into first holding pockets; the beads from the holding pockets of the bead feeding unit are fed to receiving pockets of a bead transfer unit by means of movable feeding means, then in the bead transfer unit the beads are inserted into a guiding chamber formed at the intersection of a guiding groove of a first guiding plate and a guiding groove of a second guiding plate of the bead transfer unit, at least one guiding plate is rotated relative to the second guiding plate, which forces the movement of the guiding chamber so that the distance of the guiding chamber to the axis of rotation of the guiding plates changes, and the beads from the guiding chamber or the guiding channel are conveyed to a outfeeding pocket.

3 Claims, 6 Drawing Sheets

(56) References Cited

U.S. PATENT DOCUMENTS

Figure 1:
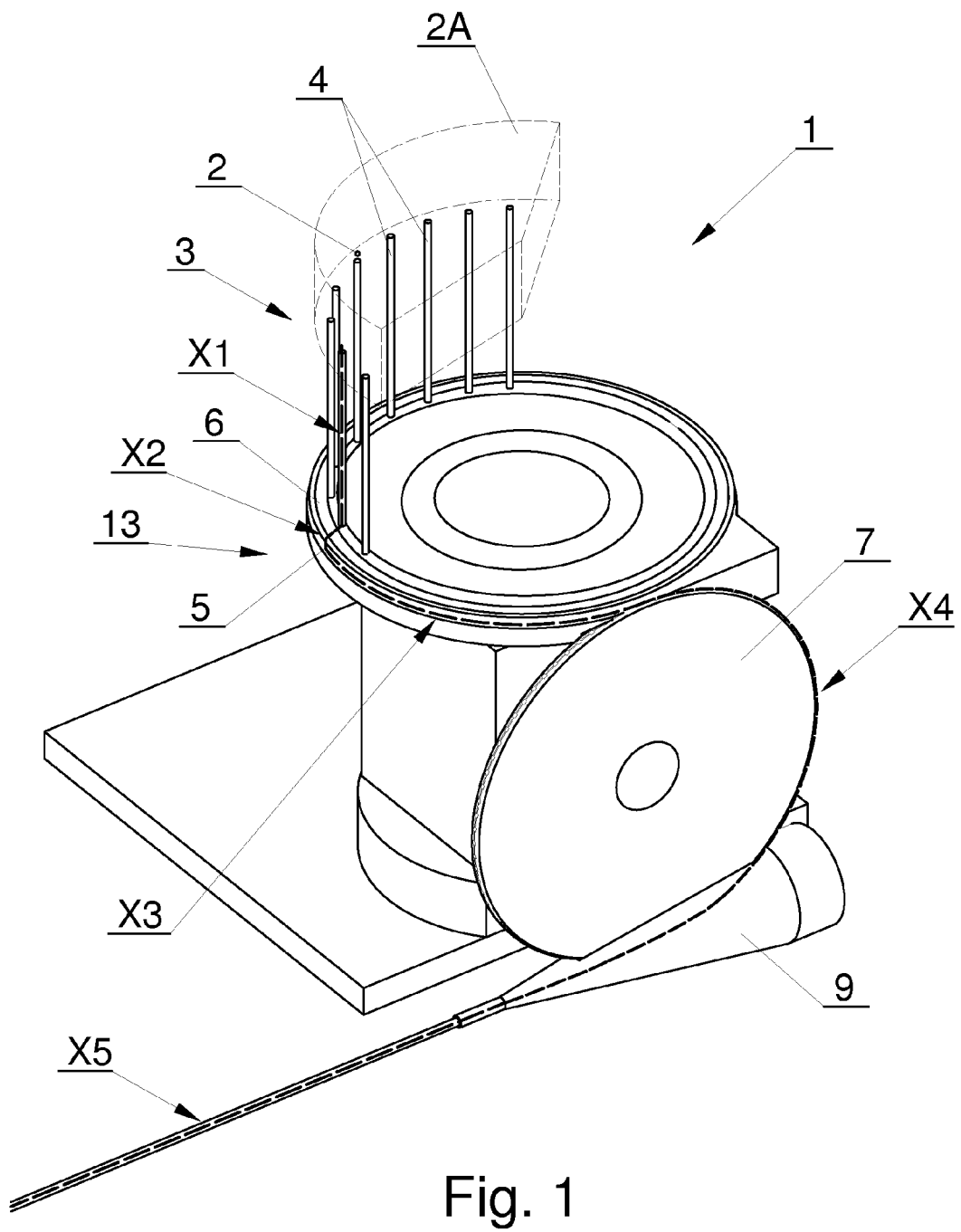

| | | | |
|---|---|---|---|
| 7,833,146 B2 * | 11/2010 | Deal | 493/49 |
| 7,975,877 B2 | 7/2011 | Garthaffner | |
| 8,303,474 B2 * | 11/2012 | Iliev et al. | 493/47 |
| 8,381,947 B2 * | 2/2013 | Garthaffner et al. | 221/72 |
| 8,622,882 B2 * | 1/2014 | Nikolov et al. | 493/47 |
| 2004/0020554 A1 | 2/2004 | Smith et al. | |
| 2009/0166376 A1 * | 7/2009 | Garthaffner et al. | 221/282 |
| 2012/0080043 A1 * | 4/2012 | Naenen et al. | 131/341 |
| 2013/0180827 A1 * | 7/2013 | Cieslikowski et al. | 198/479.1 |
| 2013/0180828 A1 * | 7/2013 | Cieslikowski et al. | 198/479.1 |
| 2014/0011652 A1 * | 1/2014 | Cieslikowski et al. | 493/39 |

* cited by examiner

BEAD FEEDING METHOD AND BEAD FEEDING UNIT

The object of the application is a bead feeding method and a unit for feeding beads used in the filters of the tobacco industry products, particularly cigarettes.

This invention concerns the feeding of spherical or oval objects which are subsequently placed into the filter material. For reasons of simplification, such objects will be hereinafter referred to as beads. Known products on the market are cigarettes the filters of which are provided with beads containing aromatic or flavour substances. The substances contained in the beads are released during smoking or yet before lighting up a cigarette by squeezing the filter resulting in crushing of the bead.

In the production process, a problem which is difficult to solve and at the same time very significant is the feeding of individual beads to a machine forming filters at great speeds in a way which guarantees that the beads remain undamaged and a high feeding efficiency is maintained, i.e. each manufactured filter actually contains a bead.

In known bead feeders, channels for feeding the beads to the area from which they are transferred to a bead delivery wheel are used, with the function of the said wheel to place the delivered beads into the filter material.

In the U.S. Pat. No. 7,975,877B2 a bead feeder is disclosed in which the bead feeding unit is provided with a plurality of radially arranged channels connected with a bowl, whereas the channels rotate with the bowl, and the beads are picked up by vacuum transfer by a bead transfer wheel from pockets situated at the outlets of the channels, and then transferred to a bead delivery wheel from which they are delivered to the filter material.

The document WO 2009/071271 has disclosed a bead feeder in which the bead feeding unit is provided with passageways rotating with the bowl, where the beads are fed to a bead delivery wheel after separating the lowermost bead from those situated above it using a stationary arched wedge-ended element. After passing through the passageway the beads are fed to the pockets of a bead delivery wheel which delivers them to the filter material.

The document WO 2009/071272 has disclosed a similar bead feeder, where the beads are fed to a bead delivery wheel using two plates having a plurality of openings and rotating relative to each other, and a bead is fed after aligning respective openings directly on top of each other and forming successive passageways to the pockets of the bead delivery wheel.

The U.S. Pat. No. 7,833,146B2 shows a device for feeding beads by curved channels from a bowl directly to a bead delivery wheel, where the channels rotate with the bead bowl, and the beads are picked up from the bowl by vacuum transfer.

The devices presented above require that during the operation of the device the bead feeding channels rotate with the bead bowl.

The objective of the invention is to develop a bead feeding method and a bead feeder in which the flow of beads in the form of a plurality of streams of individual beads in stationary feeding channels is transformed into a flow in the form of one stream of individual beads.

The subject matter of the invention is a method of feeding beads in a tobacco industry system, in a unit for transferring a bead stream, the said unit being provided with supply channels feeding individual bead streams, comprising the steps in which beads are transferred in the form of a flow along the supply channels; beads from individual supply channels are placed into first holding pockets; from the holding pockets of a bead feeding unit beads are fed to receiving pockets of a bead transfer unit, by means of movable feeding means synchronized with the transfer unit, and in the bead transfer unit the beads are inserted into a guiding chamber formed at the intersection of a guiding groove of a first guiding plate and a guiding groove of a second guiding plate of the bead transfer unit, or in a groove depressed in one of the guiding plates and forming a channel; at least one guiding plate is rotated relative to the second guiding plate, which forces the movement of the guiding chamber so that the distance of the guiding chamber to the axis of rotation of the guiding plates changes; beads are conveyed from the guiding chamber or the guiding channel to outfeeding pockets.

The object of the invention is also method wherein beads are fed into filtering material.

The object of the invention is also a unit for feeding a bead stream to the filter material in the tobacco industry, provided with a set of supply channels feeding individual bead streams. According to the invention the unit comprises: holding pockets for storing of beads, situated at the outlets of the supply channels; movable feeding means moving on a closed path in the area of the first holding pockets guiding beads to receiving pockets of a transfer unit, the movable feeding means being synchronized with the transfer unit; and a transfer unit comprising two guiding plates situated on top of each other, the guiding plates comprising guiding grooves situated so that at least one guiding groove of the first guiding plate and at least one guiding groove of the second guiding plate intersect forming at least one bead guiding chamber, or one of the guiding plates has a depressed groove whereas the other guiding plate remains smooth, and the transfer unit being provided with outfeeding pockets.

A bead feeding unit according to the invention is provided with stationary channels owing to which the number of rotating elements in the bead feeding unit has been significantly reduced. In addition, the unit makes it possible to form a stream of individual beads at higher speeds than in the units known heretofore.

Figure 2:
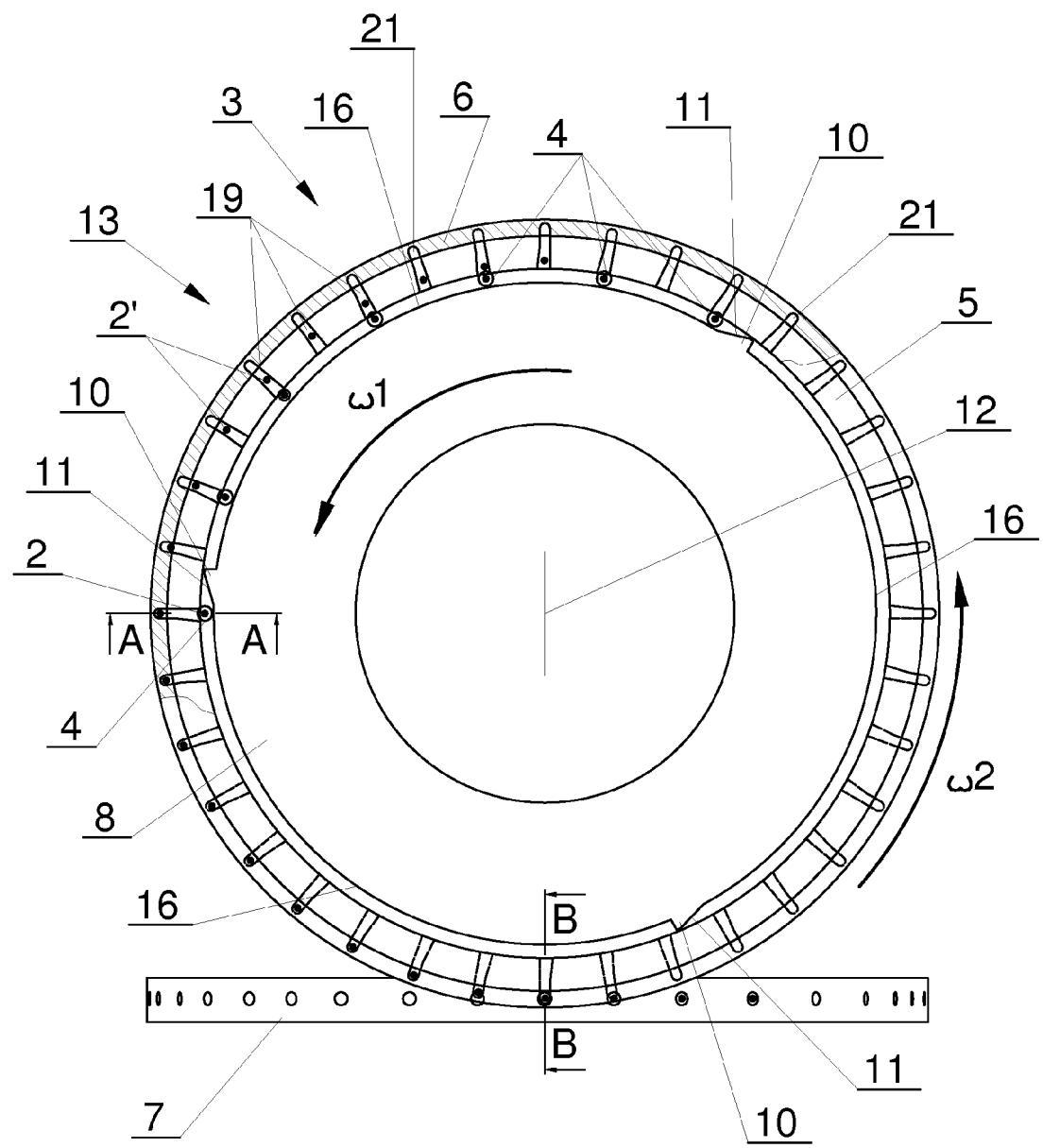
Figure 3:
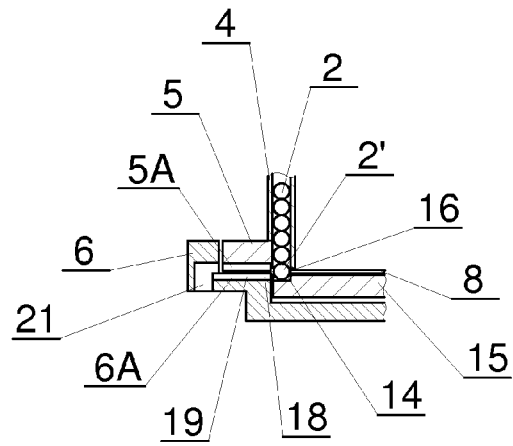
Figure 4:
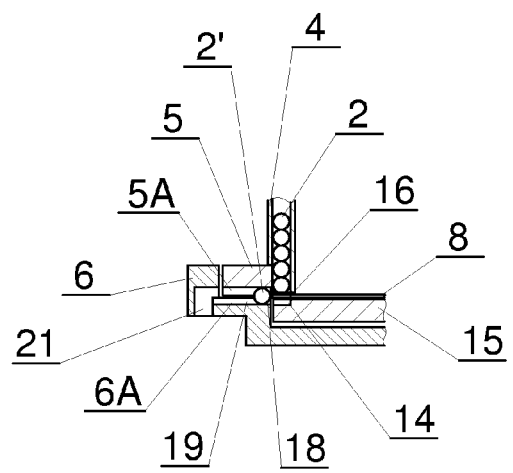
Figure 5:
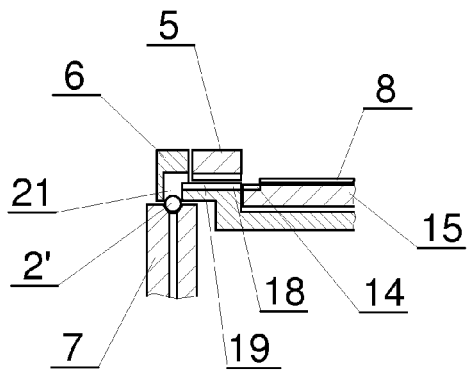
Figure 6:
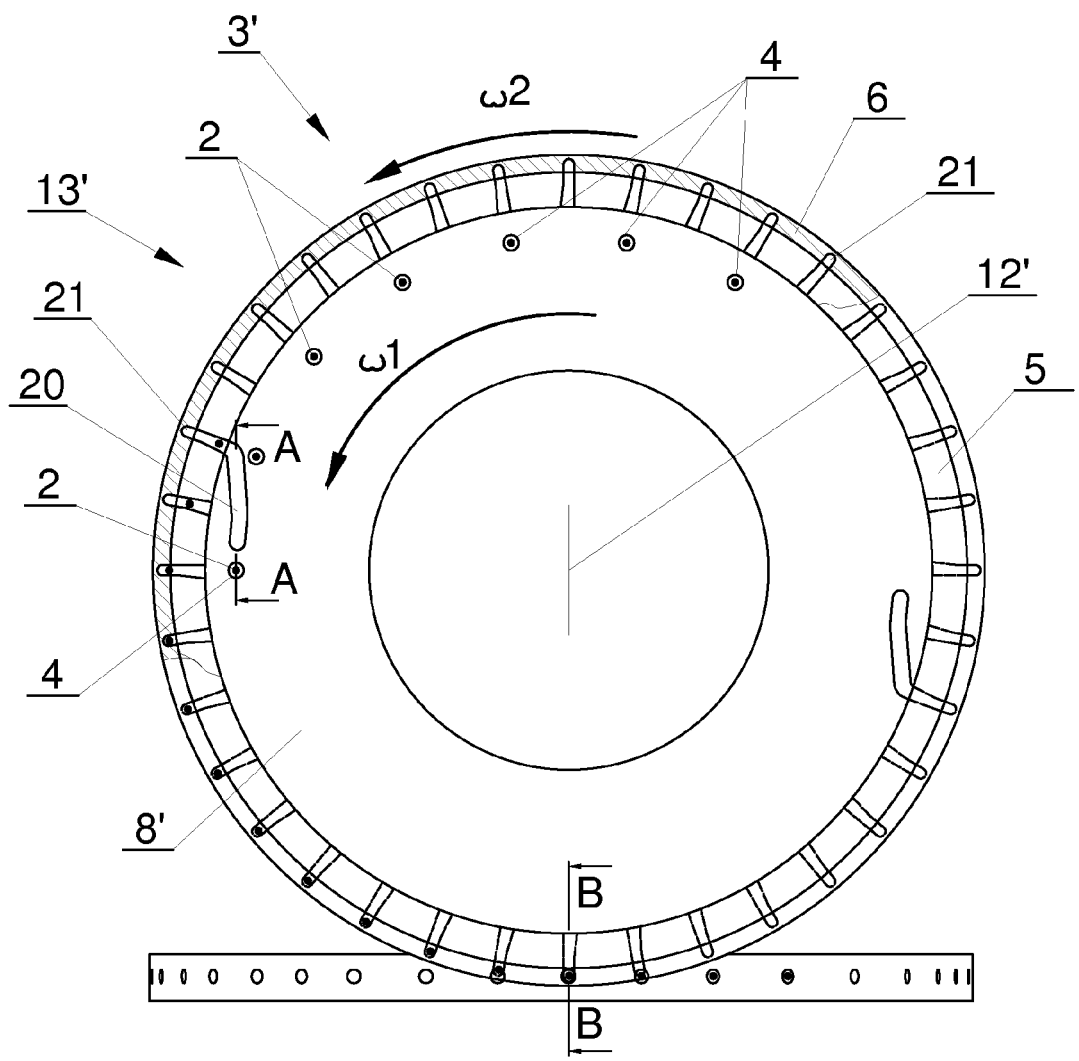
Figure 7:
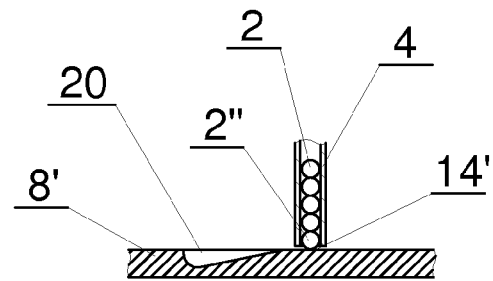
Figure 8:
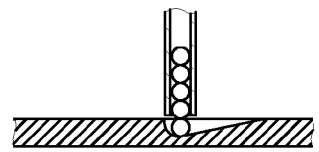
Figure 9:
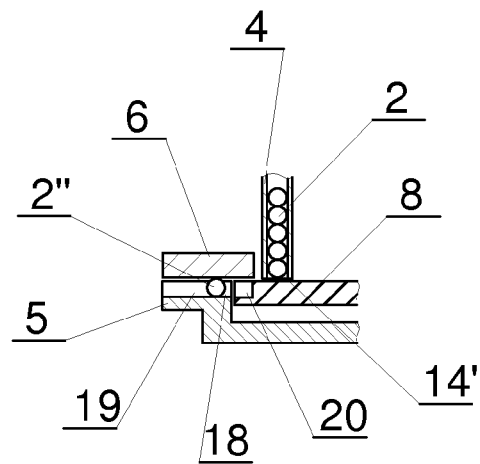
Figure 10:
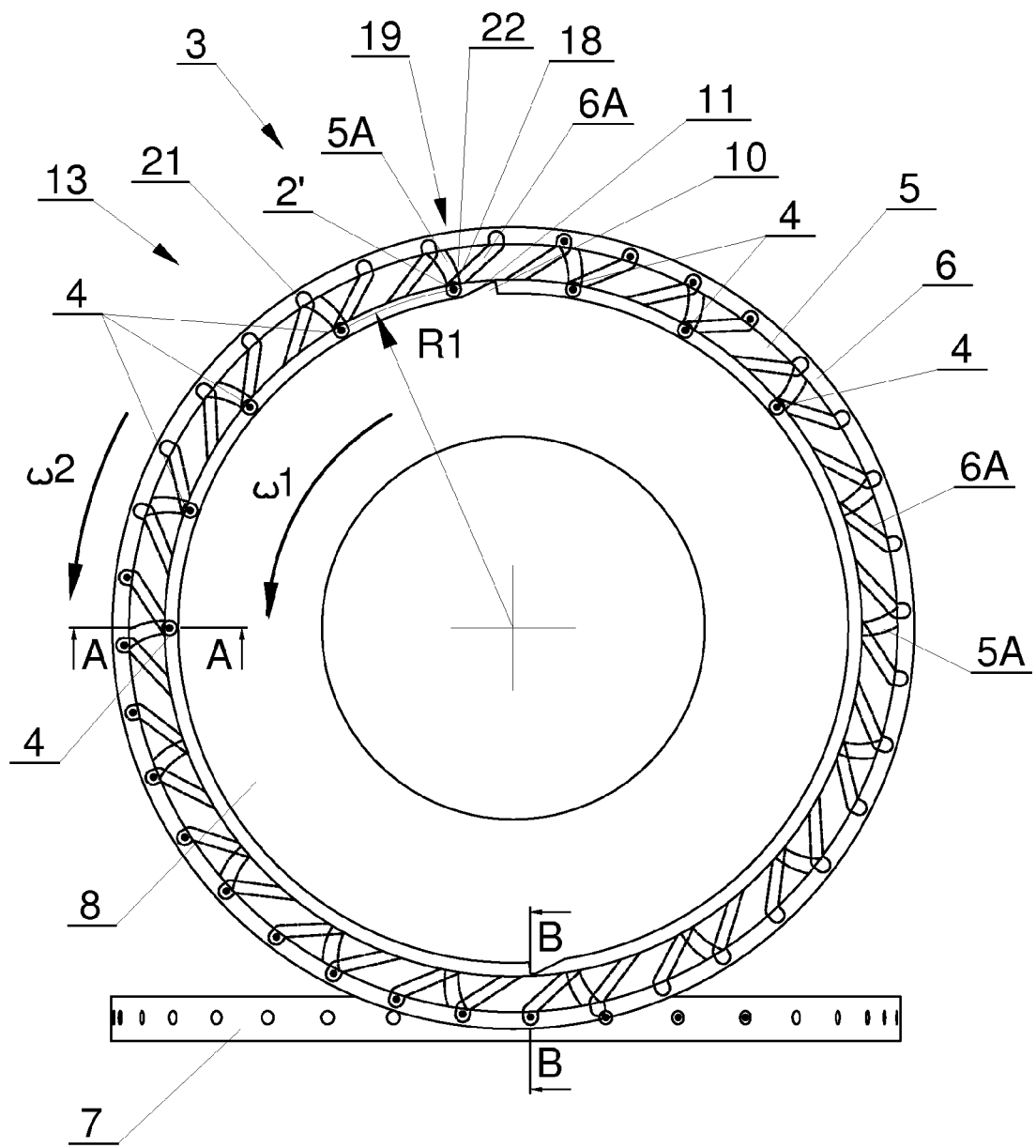

The object of the invention is shown in greater detail in a preferred embodiment in a drawing in which:

FIG. 1 shows a bead feeder in a perspective view,

FIG. 2 shows a fragment of a bead feeder in the first embodiment, in a top view, FIG. 3 shows a sectional view of a holding pocket in a first embodiment of a guiding channel, marked in FIG. 1 as A-A, before pushing a bead out of the holding pocket, FIG. 4 shows a sectional view of the holding pocket from FIG. 3 after transferring a bead to a receiving pocket, FIG. 5 shows a sectional view of a receiving pocket in a first embodiment of a guiding channel, marked in FIG. 1 as B-B, during the delivery of a bead to a receiving wheel, FIG. 6 shows a fragment of a bead feeder in a second embodiment, in a top view, FIG. 7 shows a sectional view of a holding pocket in a second embodiment of the feeder, marked in FIG. 6 as C-C, before transferring a bead, FIG. 8 shows a sectional view of a holding pocket in a second embodiment of the feeder, marked in FIG. 6 as C-C, during transferring of a bead, FIG. 9 shows a sectional view of a holding pocket in a second embodiment of the feeder, after transferring a bead to a receiving pocket, FIG. 10 shows a fragment of a bead feeder in the third embodiment, in a top view.

FIG. 1 shows a feeder 1 for beads 2 provided with a storage container 2A for beads 2, a bead stream feeding unit 3, a unit 13 for transferring the beads to a delivery wheel 7 and the delivery wheel 7 feeding the beads 2 to the filter material conveyed along a funnel 9. For reasons of simplification, the elements fastening individual units have not been shown.

The bead 2 feeding unit 3 is provided with a plurality of stationary channels in the form of tubes 4 to which beads 2 are supplied from the container 2A, whereas one bead 2 above the inlet of one of the tubes has been shown. At the outlets of the tubes 4 are situated first holding pockets 14 (FIG. 3) from which the beads are transferred to second receiving pockets 18 (FIG. 4) which receive the beads 2; the second pockets 18 are situated in the area between a first guiding plate 5 and a second guiding plate 6, whereas the guiding plates 5 and 6 belong to the unit 13 for transferring the beads 2 to the delivery wheel 7. After passing through a guiding channel 19 between the plate 5 and the plate 6, the beads 2 are transferred further to outfeeding pockets 21, and then placed into the pockets on the circumference of the delivery wheel 7 which places the beads 2 into the filter material conveyed in the funnel 9 (FIG. 1).

FIG. 2 shows a fragment of the bead feeder 1 according to the invention in the first embodiment. In a top view, the bead feeding unit 3 and the unit 13 for transferring the beads 2 to the delivery wheel 7 are shown. The bead feeding unit 3 is provided with a plurality of tubes 4, whereas all tubes 4 are filled with the beads 2 (in view of proportionally small dimensions of the beads, in the drawing they have been shown in the form of shaded small circles). For reasons of simplification, the elements fastening the tubes 4 to the frame of the feeder 1 and the drive elements have not been shown. The bead feeding unit 3 is provided with rotatable feeding means in the form of a cam 8 comprising pushing segments 10 having pushing edges 11, whereas the cam 8 rotates at a speed ω1 around the axis of rotation 12, and the pushing segments 10 move on a circular path in the area of the outlets of the tubes 4 being the area of the holding pockets 14. In the embodiment shown the guiding channels 19 together with the pockets 18 are situated in the plate 6 which rotates at the speed ω2 lower than the speed ω1. During the operation of the bead feeder, the motion of the segments 10 disposed on the rotating cam 8 and the motion of the pockets 18 are synchronized in order to enable sliding of the beads 2' into the pockets 18 situated at the beginning of the channels 19, whereas the speeds ω1 and ω2 are chosen in such a way that during the work of the unit the pushing segments 10 cause sliding of the beads into successive pockets 18 in the guiding channels 19. It can be achieved when the guiding channel 19 is situated relative to the outlet of the tube 4 and the first holding pocket 14 in such a way that renders transferring of a bead 2' possible, for example the pocket 18 receiving the bead can be situated substantially radially to the holding pocket 14. The unit is shown in a situation where several beads 2 have already been placed into the guiding channels 19, and a part has been placed into the outfeeding pockets 21 by centrifugal force.

FIG. 3 shows a sectional view of any tube 4, where for example in FIG. 2 the section was marked as A-A. The lowermost bead 2' in the bead column is situated in the holding pocket 14 disposed at the outlet of the tube 4, limited from below by a plate 15, and on the sides by the plate 5 and a circumferential edge 16 of the cam 8.

FIG. 4 shows a sectional view of the tube 4 in a situation where the pushing segment 10, moving on a circular path in the area of the first holding pockets 14, during the rotation of the cam 8 has passed a successive pocket 14 beneath a successive tube 4 and caused pushing of the bead 2' out of the first pocket 14 to the second receiving pocket 18 in the area between the first guiding plate 5 and the second guiding plate 6. Then the bead 2' is transferred substantially horizontally in the guiding channel 19, delivered to the outfeeding pocket 21 and further to the pocket on the delivery wheel 7, which has been shown in FIG. 5 presenting the section B-B of FIG. 2. An inclination of the guiding channel 19 is also possible, which can be achieved by conical shape of the plates 5 and 6.

FIG. 6 shows a fragment of a bead feeder 1' in a second embodiment in a top view which shows elements of a bead feeding unit 3' and a bead transfer unit 13'. The unit 3' is provided with a plurality of tubes 4, whereas all tubes 4 are filled with the beads 2. For reasons of simplification, the elements fastening the tubes to the frame of the feeder and the drive elements have not been shown. The bead feeding unit 3' is provided with rotatable feeding means in the form of a plate 8' comprising bead guiding channels 20, whereas the cam 8' rotates at the speed ω1 around the axis of rotation 12'. The plate 6 in which the guiding channels 19 are situated rotates at the speed ω2 lower than the speed ω1. The guiding channels 20 are shaped as curved grooves with increasing depth (FIG. 7) in order to finally direct the beads 2 radially towards the receiving pockets 18 and the guiding channels 19.

FIG. 7 shows one of the tubes 4 with the beads 2 situated inside. During the rotation of the plate 8' the guiding channel 20 will slide in under the pocket 14', after which the bead 2" situated in the pocket will start sliding into the guiding channel 20. After the bead 2" has completely slid into the guiding channel 20 (FIG. 8), the bead is directed further to the pocket 18 similar to the first embodiment (FIG. 9), after which it will be delivered further to the outfeeding pocket 21.

FIG. 10 shows a fragment of the bead feeder 1 according to the invention in another embodiment. In a top view, a fragment of the bead 2 feeding unit 3 and the unit 13 for transferring the beads 2 to the delivery wheel 7 has been shown. The unit 3 is provided with a plurality of tubes 4 (on an arc with the radius R1), whereas all tubes 4 are filled with the beads 2. For reasons of simplification, the elements fastening the tubes to the frame of the feeder 1 and the drive elements have not been shown. The bead feeding unit 3 is provided with rotatable feeding means in the form of the cam 8 comprising pushing segments 10 having pushing edges 11, whereas the cam 8 rotates around the axis of rotation 12 at the speed ω1. The first plate 5 is stationary, whereas the second plate 6 is rotatable and rotates around the axis of rotation 12 at the speed ω2 lower than the speed ω1 of the cam 8. The guiding grooves 5A and 6A of both guiding plates 5 and 6 are shown in broken lines. At the intersection of the grooves 5A and 6A forms a guiding chamber 22 which at first constitutes the receiving pocket 18 and which in view of the direction of rotation of the plate 6 and the orientation of the grooves moves so that the distance of the guiding chamber 22 to the axis of rotation 12 increases. In addition, the guiding channel 19 in which the bead 2' moves should be considered as a distance which the bead 2' covers between the receiving pocket 18 and the inlet of the outfeeding pocket 21. A solution is also possible where both plates 5 and 6 are rotatable.

The bead 2' is placed into the outfeeding pocket 21, will move further with the outfeeding pocket 21 moving on an arc and rotating with the guiding plate 6 at the speed ω2, finally the bead is transferred to the delivery wheel 7, the section B-B is shown in FIG. 5.

FIG. 1 shows in thick broken lines the path along which a bead travels in all embodiments described above. An exemplary bead 2 moves from the container 2A downward in one of the channels 4 to the holding pocket 14, in the drawing this section of the path is marked with X1. The next section of the path from the holding pocket 14 through the receiving pocket 18 to the outfeeding pocket 21 is marked with X2. In the next section of the path X3 the bead is transferred on an arc in the pocket 21 to the place where the bead is transferred to the delivery wheel 7. Then, in the section X4, it moves in a pocket on the wheel 7. Afterwards it is placed into the filter material within the funnel 9 and moves further along the final section of the path X5.

The invention claimed is:

1. A method of feeding beads, in a unit (1) for transferring a bead stream in a tobacco industry system, the unit being provided with supply channels feeding individual bead streams, comprising the steps in which
    beads are transferred in the form of a flow along the supply channels (4);
    beads from individual supply channels are placed into first holding pockets (14);
    beads from the holding pockets (14) of a bead feeding unit (3) are fed to receiving pockets (18) of the bead transfer unit (13) by means of movable feeding means (8) synchronized with the transfer unit (13), and
    in the bead transfer unit (13) beads are inserted into a guiding chamber (22) formed at the intersection of a guiding groove (5A) of a first guiding plate (5) and a guiding groove (6A) of a second guiding plate (6) of the bead transfer unit (13), or into a groove (5A, 6A) depressed in one of the guiding plates (5, 6) forming a channel (19);
    at least one guiding plate (5, 6) is rotated relative to the second guiding plate (5, 6), which forces the movement of the guiding chamber (22) or a bead within the channel so that the distance of the guiding chamber (22) or a bead within the channel to the axis of rotation of the guiding plates changes;
    beads are conveyed from the guiding chamber (22) or the guiding channel (19) to a outfeeding pocket (21).

2. The method according to claim 1 wherein beads are fed into filtering material.

3. A unit for feeding a bead stream in a tobacco industry system, provided with a set of supply channels feeding individual bead streams, comprising
    holding pockets (14) for storing of beads, situated at the outlets of the supply channels (4);
    movable feeding means (8) moving on a closed path in the area of the first holding pockets (14) directing beads to receiving pockets (18) of a transfer unit (13),
    the movable feeding means (8) being synchronized with the transfer unit (13); and
    the transfer unit (13) comprising two guiding plates (5, 6) situated on top of each other, the guiding plates (5, 6) comprising guiding grooves (5A, 6A) situated so that at least one radially guiding groove of the first guiding plate and at least one radially guiding groove of the second guiding plate intersect and form at least one bead radially moving guiding chamber, or one of the guiding plates (5, 6) has a depressed radial groove (5A, 6A) whereas the second guiding plate remains smooth, and
    the transfer unit being provided with outfeeding pockets (21).

* * * * *